United States Patent [19]

Childers, Jr.

[11] Patent Number: 4,919,965
[45] Date of Patent: Apr. 24, 1990

[54] METHOD OF TOASTING SLICES OF POTATO AND OTHER PRODUCE

[76] Inventor: Melvin D. Childers, Jr., 7112 Baltusrol La., Charlotte, N.C. 28210

[21] Appl. No.: 273,980

[22] Filed: Nov. 21, 1988

[51] Int. Cl.⁵ ............................................. A23L 1/217
[52] U.S. Cl. .................................... 426/615; 426/468; 426/523; 426/637; 426/808
[58] Field of Search ............... 426/615, 637, 466, 468, 426/523, 808, 465, 804; 99/372, 385, 386

[56] References Cited

U.S. PATENT DOCUMENTS

| | | | |
|---|---|---|---|
| 1,956,130 | 4/1934 | Neuberger | 99/372 X |
| 2,146,171 | 2/1939 | Burch | 99/372 |
| 2,401,392 | 6/1946 | Ware et al. | 426/466 |
| 3,493,400 | 2/1970 | Truckenbrodt et al. | 426/466 X |
| 4,135,004 | 1/1979 | Finkel | 426/637 X |
| 4,283,425 | 8/1981 | Yuan et al. | 426/637 X |
| 4,749,579 | 6/1988 | Haydock et al. | 426/637 X |

*Primary Examiner*—Arthur L. Corbin
*Attorney, Agent, or Firm*—Daniel E. McConnell

[57] ABSTRACT

This invention relates to a process for toasting agricultural produce slices and more particularly potato slices and an apparatus for achieving this result. The resulting product is free of oils and fats, which is advantageous for people who are conscious of their diet. Briefly stated, the agricultural produce, nominally a potato, is washed, peeled if desired, sliced, and seasoning applied to the sliced produce and the sliced seasoned pieces are allowed to stand and absorb the seasoning. The seasoned slices are then toasted in a process where cooking heat is applied by a device with opposed cooking surfaces. The cooking surfaces have a relieved surface so that approximately one half of said surface comes into contact with the produce slices being cooked. Various cooking surface designs are effective such as a waffle pattern, strips, or parallel serpentine surfaces. The toasting action occurs when the opposed heated cooking surfaces compress the agricultural produce slices driving the moisture in the slices to the voids in the cooking surface where the moisture is driven off. The result is a crisp, fat and oil free chip, nominally a potato chip.

10 Claims, 2 Drawing Sheets

METHOD OF TOASTING SLICES OF POTATO AND OTHER PRODUCE

FIELD AND BACKGROUND OF INVENTION

This invention relates to a method of processing agricultural produce slices and more particularly, potato slices by a toasting process. Toasting occurs by compressive, opposed, contact surfaces which toast the sliced produce in a fat and oil free environment. The resulting product has a crisp texture and may have its flavor enhanced by the addition of seasonings, preferably before the toasting process. A important feature is that the resulting chip is free of oils and fats and may be consumed by persons who are limited in the intake of such food products.

Potatoes have a high water content, as do most other vegetables. Cooking potato slices to produce crisp chips has generally been achieved by preparing potato slices through conventional means and deep frying. Seasonings have been added to enhance the flavor of the chips. The deep frying process produces crisp chips by driving the water from the chip and replacing it with the fat or oil used in the deep frying process. The resulting products have a high oil and fat content which is not desirable for persons who are concerned about the intake of such substances.

Efforts have been made to produce a low fat potato chip as is disclosed in Yuan et al U.S. Pat. No. 4,283,425. The Yuan patent discloses a potato chip having fat added to about 10%. The chip is coated with globular protein, a layer of edible oil is applied on top of the protein coating and the chip is subjected to microwave cooking. Automatic seasoning of food during the cooking process is disclosed in the Lohr U.S. Pat. No. 4,137,337. The technology disclosed teaches the method of applying seasoning to food being cooked in steam cookers.

BRIEF DESCRIPTION OF INVENTION

With the forgoing particularly in mind, it is an object of this invention to produce a potato chip which has the texture and characteristics associated with a potato chip but is virtually free of oils and fats. In realizing this object of this invention, a potato chip is processed by conventional methods, seasoned and the chip allowed to sit while the seasoning is absorbed, and toasted between opposed cooking surfaces which engage the chip under pressure simultaneously driving moisture from the chip and toasting it.

A further object of this invention is to construct cooking surface which achieve the desired toasting of potato chips, as well as other agricultural produce slices. In realizing this object of this invention, opposed cooking surfaces are arranged to engage sliced produce under compressive force. The faces of the cooking surfaces are configured so that there are raised surfaces that come into contact with the produce slices. The resulting voids create channels into which the moisture driven from the slices escape as as result of the compressive force of the opposed cooking surfaces engaging the produce. Heat drives off the escaped moisture.

BRIEF DESCRIPTION OF DRAWINGS

Some of the objects of the Invention having been stated, other objects will appear as the description proceeds, when taken in connection with the accompanying drawings, in which.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
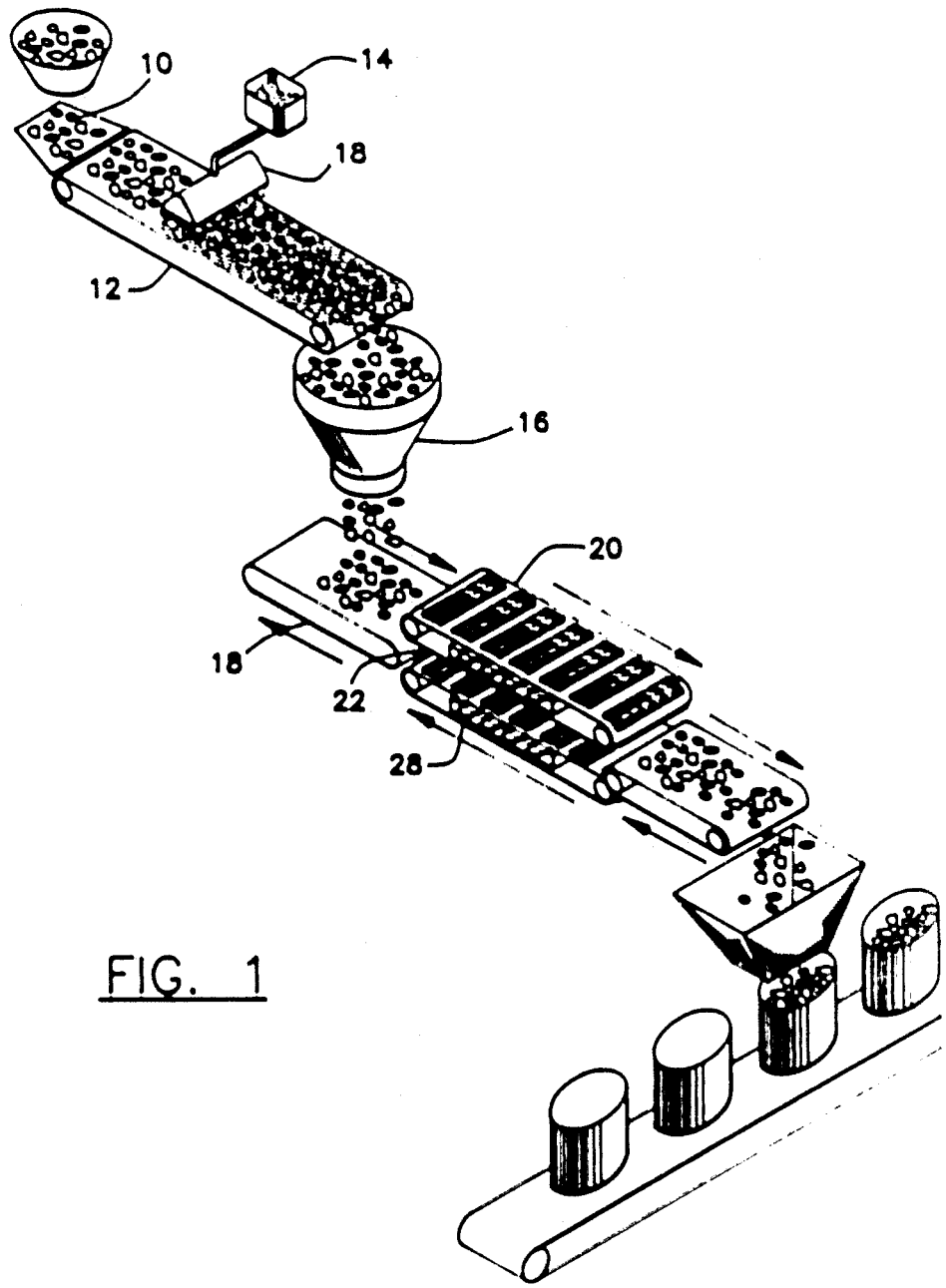
FIG. 1 is a diagrammatic drawing illustrating the process of toasting potato chips and other agricultural produce slices using cooking surfaces on continuous movable belts.

Referring more particularly to the accompanying drawings, a process for toasting potato chips is shown in FIG. 1. Potato chips, or other suitable sliced agricultural produce, are prepared by customary methods. In processing, the potatoes are washed, and if desired peeled, then sliced. Potato chips 10 are deposited on a conveyer 12, by conventional means which brings potato chips 10 into position to have seasoning 14 applied to the potato chips 10 by an applicator 18. The process for bringing the chips and seasoning into contact is not fixed. Any combination of machinery that effects the result of having seasoning 14 applied to the potato chips 10, or other suitable vegetables and fruits, meets the object of this invention. It is important that the seasoned potato chip 10 be allowed to stand for a while to absorb the seasoning 14. To that end the seasoned potato chips may be held in a holding tank 16, or in other suitable means. The time that it takes for the potato chips 10 to absorb the seasoning 14 may also be achieved by having the seasoned potato chips 10 dwell longer on conveying means before the next step in the process occurs. Conveyer 18 brings the seasoned chips into contact with opposed cooking surfaces 20 which are mounted upon opposed continuous loop belts 22 for advancing the opposed cooking surfaces 20 into close proximity to one another so that each opposed cooking surface 20 has its opposed cooking surface 20 counterpart in mirror image as the continuous loops 22 advance and potato chips 10 are engaged by the advancing cooking surfaces 20. The cooking surfaces 20 are arranged so that they engage potato chips 10, or other suitable vegetable and fruit slices, with compressive force to apply pressure on both sides of the chips 10. The resulting pressure drives moisture from the chips 10 to the voids which form channels in the faces of the cooking surfaces 20.

More particularly, the cooking surfaces may have heat applied to the faces 20 shown in FIG. 1. The cooking surfaces 20, 24, and 26 are representative of the many configurations that the surfaces may take.

A potato chip 10, nominally 1.5 cm. thick, the thickness of which is variable depending upon the heat and pressure applied and the moisture and specific gravity of the potato chips 10, is toasted for approximately 1.5 minutes at 350 degrees fahrenheit, under compressive force applied by the opposed cooking surfaces 20. The toasting effect may be accomplished by various conventional cooking methods. By way of example and not limitation, cooking coils 28 may be placed in the cooking surfaces 22 or adjacent to them. Also, a heating tunnel may be employed to surround the cooking surfaces 20 and all or part of the continuous loop 22 on which the cooking surfaces are mounted thereby effecting the toasting of potato chips 10.

Figure 4:
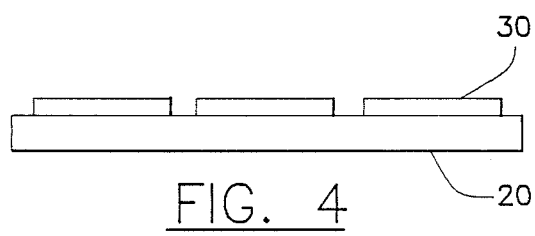
FIG. 4 is a cross section of a cooking surface.

The toasting effect is enhanced by the migration of a certain percentage of the moisture from the potato chips 10 to the voids in the cooking surfaces 20. In the configuration of this invention shown in FIG. 1, cooking surfaces 20 come into opposed position as the continuous loops 22 move in synchronization. The raised portion 30 of the cooking surfaces 20 are 0.5 cm. high as shown in cross section in FIG. 4. The raised portion 30 of cooking surface 20 is approximately 50% of the total area of the cooking surface 20. However, the raised portion 30 of cooking surface 20 may vary as a percentage of the total area of the cooking surface 20 substantially from 50% as a direct result of the variable parameters of moisture content and specific gravity of the agricultural produce slices toasted and the toasting parameters of heat and pressure applied to the produce slices. Cooking surfaces 24 and 26 also have raised portions 32 and 34 which are 0.5 cm. high and approximately 50% of the area of cooking surfaces 32 and 34 respectively.

As the opposed cooking surfaces 20 move into mirrored position the gap between the raised portion 30 of cooking surfaces 20 is 0.5 cm. It is this spacing which creates the compressive force on a potato chip which is nominally 1.5 cm. thick thereby squeezing moisture from the potato chip 10 into the channels on the face of cooking surfaces 20. The moisture driven to the channels is partially evaporated as heat is applied. The result of the toasting process is a potato chip 10 having the texture substantially of a potato chip made by conventional deep frying methods.

Figure 2:
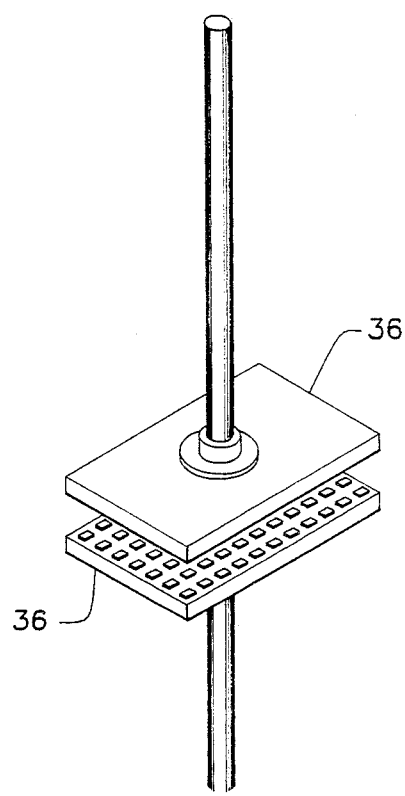
FIG. 2 is an alternate diagrammatic sketch of the process of toasting potato chips and other agricultural produce slices using opposed movable cooking surfaces.
Figure 3:
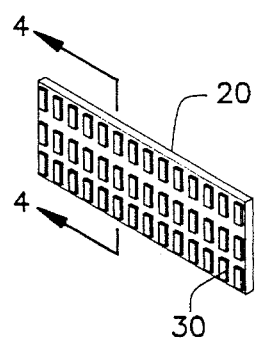
FIG. 3 is is a diagrammatic view of alternate cooking surfaces.
Figure 3:
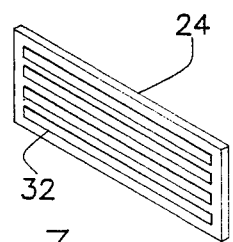
Figure 3:
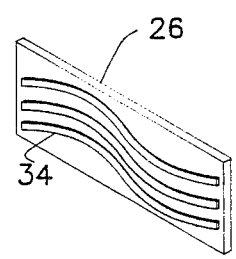

FIG. 2 shows an alternate embodiment of this invention in which the step of compressing and cooking a potato chip occurs between cooking surfaces 36 which are movably mounted to allow potato chips 10 to be deposited thereon by conventional means and toasted as the cooking surfaces 36 compress potato chips 10 and heat is applied by conventional means. The spacing between cooking surfaces 36 is the same as in the previous embodiment shown in FIG. 1 and the configuration and dimensions of the cooking surfaces 36 is the same as cooking surfaces 20, 24 and 26. The principle teaching of this embodiment is that cooking surfaces 36 may toast a potato chip 10 in a motion in which the cooking surfaces are opposed and movable to engage and cook a potato chip 10 under a predetermined compressive force.

The process of toasting a potato chip, as disclosed, is equally applicable to other vegetables and fruits. The cooking parameters of heat and pressure may vary depending upon the moisture content of the produce as well as the thickness of the slices toasted. The result is nonetheless the same, a toasted product that has the crispness and texture of a fried product.

In the drawings and specifications there has been set forth a preferred embodiment of the invention and, although specific terms are used, the description thus given uses terminology in a generic and descriptive sense only and not for purposes of limitation.

What is claimed is:

1. A process of preparing toasted slices of agricultural produce to produce in a single cooking step a crisp chip snack food product essentially free of added oils and fats and directly edible without further preparation which consists essentially of the steps of:
    washing raw agricultural produce,
    slicing the washed raw agricultural produce into thin slices,
    applying seasoning to the thin slices of raw agricultural produce and allowing the seasoning to dwell on the raw slices for a sufficient period of time to allow it to be absorbed into the raw slices, and
    cooking the seasoned raw slices under heat and pressure imposed between an opposing pair of heated cooking surfaces so as to drive out moisture from the slices and toast the slices.

2. A process of preparing toasted agricultural produce slices as recited in claim 1 wherein the step of washing the agricultural produce is preceded by a step of peeling the agricultural produce.

3. A process of toasting potato slices to produce in a single cooking step a crisp chip snack food product essentially free of added oils and fats and directly edible without further preparation and which consists essentially of the steps of:
    washing a raw potato,
    slicing the washed raw potato, and
    cooking the slices of raw potato between heated opposed cooking surfaces, said opposed heated cooking surfaces having raised surfaces thereby defining channels between said raised surfaces, while
    applying pressure to said potato slices by opposed cooking surfaces sufficient to drive moisture from said potato slices into said channels in said opposed cooking surfaces thereby partially evaporating the moisture.

4. A process of toasting potato slices as recited in claim 3 wherein the step of cooking the potato slices occurs between opposed cooking surfaces which have raised portions that are approximately 50% of the area of the opposed cooking surfaces.

5. A process of toasting potato slices as recited in claim 3 wherein the potato is peeled before slicing.

6. A process for toasting potato slices according to claim 3 wherein said opposed cooking surfaces have a waffle pattern.

7. A process for toasting potato slices according to claim 3 wherein said opposing cooking surfaces have a strip pattern.

8. A process for toasting potato slices according to claim 3 wherein said opposing cooking surfaces have a serpentine pattern.

9. A process for toasting potato slices according to claim 3 including a further step of applying seasoning to said potato slices prior to cooking said slices.

10. A process for toasting potato slices according to claim 9 including a further step of allowing the applied seasoning to dwell on said potato slices for a period of time to allow absorption thereof.

* * * * *